UNITED STATES PATENT OFFICE.

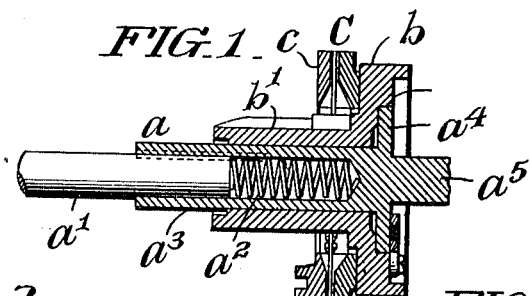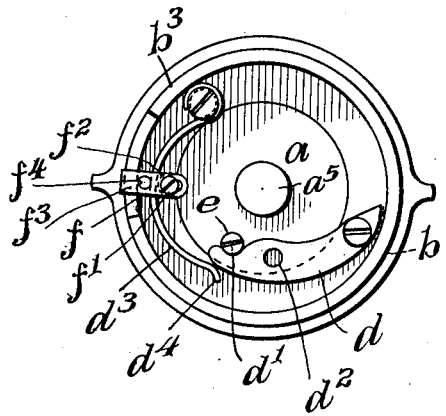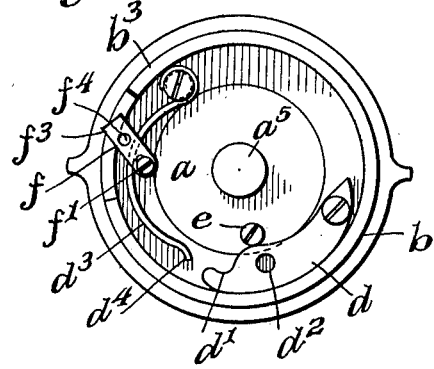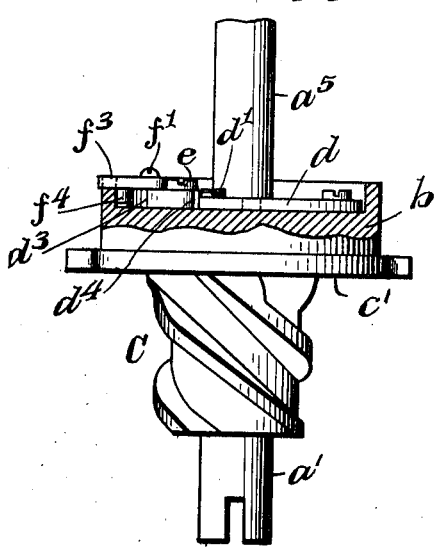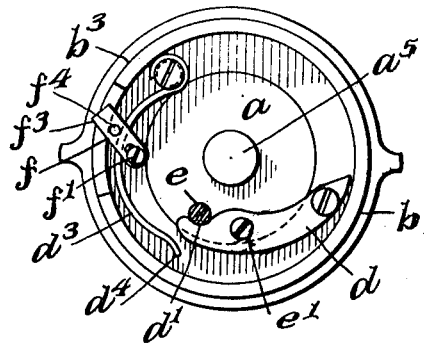

WILLIAM W. DRYDEN, OF PHILADELPHIA, PENNSYLVANIA, ASSIGNOR TO CHARLES E. TROEMNER, OF PHILADELPHIA, PENNSYLVANIA.

CLUTCH MECHANISM.

974,248.  Specification of Letters Patent.  Patented Nov. 1, 1910.

Application filed June 14, 1910. Serial No. 566,764.

*To all whom it may concern:*

Be it known that I, WILLIAM W. DRYDEN, a citizen of the United States, residing at the city of Philadelphia, in the county of Philadelphia and State of Pennsylvania, have invented certain new and useful Improvements in Clutch Mechanism, of which the following is a specification.

My invention has relation to a simple and effective clutch mechanism to automatically control a revoluble driving member, such as a coffee mill, so that when foreign matter, as nails, sticks, or the like, is brought into contact with the working faces of the grinding-means thereof, such driving member will run free to avoid damaging working faces of the grinding-means for subsequent use thereof; and in such connection my present invention relates particularly to constructive arrangement of a clutch-mechanism in such a mill for the defined purpose.

The nature and scope of my present invention will be more fully understood from the following description taken in connection with the accompanying drawings forming part hereof, in which—

Figure 1, is a vertical longitudinal section through so much of a power operated coffee mill as will serve to illustrate a clutch mechanism of my invention in application to the driving and driven members of such a mill for controlling action of the grinding-means thereof. Figs. 2 and 3, are respectively, end elevational views of Fig. 1, of the said clutch-mechanism in operative and inoperative relations. Fig. 4, is a top or plan view partially broken away, of driving and driven members of a mill showing said clutch-mechanism in application to said driven member and a stud or pin of said mechanism in connection with said driving member; and Fig. 5, is an end elevational view of a modified arrangement of the said clutch-mechanism.

Referring to the drawings, $a$ is a driving member for a coffee mill, consisting of a shaft $a^1$, and a coiled spring $a^2$, held in a tubular bearing sleeve $a^3$, the ends of which spring are arranged to bear against the said shaft and sleeve. The sleeve $a^3$, has integrally formed therewith at the forward end, a disk $a^4$, and a solid extension forming a journal $a^5$, as clearly shown in Fig. 1. Surrounding the disk $a^4$, and arranged to revolve independently of the same, is a cup-shaped casting $b$, having a sleeve $b^1$, arranged to encircle the sleeve $a^3$. The sleeve $b^1$, carries loosely the member $c$, of a grinding means C, and the other member $c^1$ thereof, is secured to the casting $b$, and turns therewith, as shown in Fig. 1. The cup-shaped casting $b$, with its accessories mentioned, constitutes the driven member of the mill. Around the cup-shaped driven-member $b$, in one portion in pivoted relation is a locking-pawl $d$. This locking-pawl in the forward portion is provided with a notch $d^1$, and a perforation $d^2$, in the body thereof, for a purpose to be presently explained.

$d^3$, is a bow-shaped spring, having one end preferably formed with an upturned lip $d^4$. This spring $d^3$, is pivoted to the casting and arranged so that when the notch $d^1$, of the locking-pawl $d$, engages a stud or pin $e$, of the disk $a^4$, of the driving member $a$, the locking-pawl $d$, will be held in contact with said stud or pin by a shiftable tension device $f$, pivoted to the driven member $b$. This tensioning device, consists of a post $f^1$, carrying a frictional bearing sleeve $f^2$, to contact with the inner surface of the bow-spring $d^3$. This post is connected with an oblong slotted bar $f^3$, in movable connection therewith and has a downward projecting bolt $f^4$, fixed to said bar and arranged to be jammed against the outer surface of said bow-spring $d^3$. The slotted bar $f^3$, extends outwardly through a recess or offset formed in the rim $b^3$, of the driven-casting $b$, as clearly shown in Figs. 2, 3, and 4, so that by shifting the bar $f^3$, can be readily increased or decreased the tension of the bow-spring $d^3$, against the locking-pawl $d$, in contact with the stud-pin $e$, of the driving member $a$, to resist in any ordinary use of the said grinding-means either of the members $a$ and $b$, running independently of each other until some sort of extraneous matter is brought into contact with working faces of the said grinding-means C, to interfere with the workings thereof, when the normal tension of the spring $d^3$, against the locking-pawl $d$, and the stud-pin $e$, will be overcome to free the same from the locking-pawl and thereby of both members $a$ and $b$, revolving independently of each other, but without damaging the working faces of the grinding-means C. In case of loss of a stud-pin $e$, by breaking or otherwise, a jam pin $e^1$, Fig. 5, can be inserted in the perforation of the locking-pawl $d$, so as to be frictionally brought against the surface of the disk $a^4$, carried by the driving member $a$, and with the bow-spring $d^3$, out of contact with the locking-pawl $d$, as clearly shown in Fig. 5. The position of the parts in Fig. 5, are respectively, those occupied under circumstances, as above related.

Having thus described the nature and object of my invention, what I claim as new and desire to secure by Letters Patent is:—

1. In a clutch mechanism, a locking-pawl with a notch and connected with a driven-member, a bow-shaped spring, adapted to bear against said locking-pawl, in operative position and connected with said member, a pin arranged so as to engage the notch of said locking-pawl and to be held in contact normally therewith by said spring and a tensioning device connected with said driven-member and provided with a shiftable depending frictional bearing and jamming means adapted to hold said spring in contact in normal relation, with said locking-pawl.

2. In a clutch-mechanism, a locking-pawl connected with a driven-member, a bow-shaped spring adapted to bear against said locking-pawl in operative position and connected with said member, a pin adapted to engage the locking-pawl with a driving-member and a tensioning device connected with said driven-member and provided with a shiftable depending frictional bearing and jamming means adapted to hold said spring in contact in normal relation, with said locking-pawl.

In witness whereof, I have hereunto set my signature in the presence of two subscribing witnesses.

WILLIAM W. DRYDEN.

Witnesses:
J. WALTER DOUGLASS,
THOMAS M. SMITH.